(12) United States Patent
Dalrymple

(10) Patent No.: US 8,490,264 B2
(45) Date of Patent: Jul. 23, 2013

(54) DISASSEMBLY STATION

(75) Inventor: Joshua Kyle Dalrymple, Columbia, SC (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 226 days.

(21) Appl. No.: 13/017,175

(22) Filed: Jan. 31, 2011

(65) Prior Publication Data

US 2011/0219595 A1   Sep. 15, 2011

Related U.S. Application Data

(60) Provisional application No. 61/312,192, filed on Mar. 9, 2010.

(51) Int. Cl.
    *B25B 27/14*   (2006.01)
(52) U.S. Cl.
    USPC ............. 29/280; 29/213.1; 29/263; 29/267; 29/278; 29/219; 123/470
(58) Field of Classification Search
    USPC .................. 29/213.1–280; 123/470
    See application file for complete search history.

(56) References Cited

U.S. PATENT DOCUMENTS

| | | | | |
|---|---|---|---|---|
| 3,670,389 A * | 6/1972 | Shepanski | ............... | 29/256 |
| 3,739,452 A * | 6/1973 | Gadberry | ............... | 29/254 |
| 4,110,886 A * | 9/1978 | Wendler et al. | ............... | 29/255 |
| 4,293,992 A * | 10/1981 | Webb | ............... | 29/267 |
| 4,665,602 A * | 5/1987 | Woodward et al. | ............... | 29/254 |
| 4,780,942 A * | 11/1988 | Bernat | ............... | 29/219 |
| 4,894,900 A * | 1/1990 | Rausfeisen et al. | ............... | 29/256 |
| 5,014,409 A * | 5/1991 | Hippach | ............... | 29/267 |
| 5,020,203 A * | 6/1991 | Rix | ............... | 29/255 |
| 5,075,947 A * | 12/1991 | Jessup et al. | ............... | 29/254 |
| 5,960,774 A * | 10/1999 | Norgauer et al. | ............... | 123/470 |
| 6,363,596 B1 * | 4/2002 | Reiter et al. | ............... | 29/278 |
| 6,397,445 B1 * | 6/2002 | Reiter et al. | ............... | 29/213.1 |
| 6,553,969 B1 * | 4/2003 | Hans et al. | ............... | 123/470 |
| 6,618,918 B2 * | 9/2003 | Reiter et al. | ............... | 29/213.1 |
| 6,629,349 B2 * | 10/2003 | King | ............... | 29/267 |
| 6,820,315 B1 * | 11/2004 | Hans et al. | ............... | 29/263 |
| 7,293,358 B2 | 11/2007 | Wildrick | | |
| 2009/0102108 A1 | 4/2009 | Kruse | | |

\* cited by examiner

*Primary Examiner* — Richard Chang

(74) *Attorney, Agent, or Firm* — Jeffrey P. Clafa; Mark C. Bach

(57) ABSTRACT

An apparatus comprising a holding unit configured to hold a fuel injector for disassembly, a removal unit and an actuating unit. The removal unit comprises a first removal tool for removing a circlip and ferrule ring from the fuel injector, a second removal tool for removing a cone nut from the fuel injector, and a third removal tool for removing a screw from the fuel injector. The actuating unit comprises a first actuator configured to operate the holding unit, a second actuator configured to move the removal unit, and a third actuator configured to operate the third removal tool.

16 Claims, 5 Drawing Sheets

DISASSEMBLY STATION

CROSS REFERENCE TO PRIOR APPLICATIONS

This application claims the benefit from U.S. Provisional Application No. 61/312,192 filed on Mar. 9, 2010, which is hereby incorporated by reference for all purposes as if fully set forth herein.

FIELD OF THE DISCLOSURE

This disclosure is directed to a disassembly station, and particularly to a disassembly station for removing a circlip, a ferrule ring, a nut, a screw, and/or the like, from a fuel injector, or the like.

BACKGROUND OF THE DISCLOSURE

Fuel injectors, such as, for example, diesel fuel injectors, typically have several components, such as, for example, a circlip, a ferrule ring, a cone nut, a screw and the like. It is frequently necessary to remove some or all of these components before remanufacturing. However, different components require different removal processes involving different removal tools. Accordingly, there is a need for a device and a process that simplify and shorten the removal retaining components from a fuel injector.

SUMMARY OF THE DISCLOSURE

According to an aspect of the disclosure, an apparatus is provided for disassembling a fuel injector. The apparatus comprises: a holding unit configured to hold a fuel injector for disassembly; a removal unit comprising: a first removal tool for removing a circlip and ferrule ring from the fuel injector; and a second removal tool for removing a cone nut from the fuel injector; and a third removal tool for removing a screw from the fuel injector; and an actuating unit comprising: a first actuator configured to operate the holding unit; a second actuator configured to operate the removal unit to the fuel injector; and a third actuator configured to operate the third removal tool. The holding unit may comprise: a socket that receives the fuel injector; and a dock connected to the first actuator and configured to lock the fuel injector on the socket. The first actuator may comprise: a first handle; and a first pivot connector coupled between the first handle and the dock and configured to transfer an applied force from the first handle to the dock. The dock may be configured to open and expose the socket when the first handle is pulled, and further configured to close and lock the fuel injector on the socket when the first handle is pushed. The second actuator may comprise: a second handle; and a second pivot connector coupled between the second handle and the removal unit, wherein the second pivot connector is configured to transfer an applied force from the second handle to the removal unit. The removal unit may be configured to engage the fuel injector for disassembly when the second handle is pulled down, and further configured to disengage from the fuel injector when the second handle is pushed up. The first removal tool may be configured to dislodge the circlip and the ferrule ring when the removal unit is pushed down, and further configured to remove the circlip and the ferrule ring from the fuel injector when the removal unit is pulled up.

The apparatus may further comprise a pneumatic circuit configured to power the second removal tool and the third removal tool. The second removal tool may comprise a first screwdriver. The first screwdriver may be powered by the pneumatic circuit when the first handle is pushed and the second handle is pulled down. The third removal tool may comprise a second screwdriver. The second screwdriver may be powered by the pneumatic circuit when the third actuator is activated by a user. The third actuator may comprise a pedal connected to the pneumatic circuit. The screw may comprise an M4 screw. The fuel injector may comprise two M4 screws and the third removal tool comprises two second screwdrivers for unscrewing the two M4 screws.

According to a further aspect of the disclosure, an apparatus is provided for disassembling a fuel injector, comprising: a holding unit configured to hold a fuel injector for disassembly; a removal unit comprising a nut remover and a screwdriver; and an actuating unit comprising a first actuator configured to operate the holding unit, a second actuator configured to move the removal unit, and a third actuator configured to operate the removal unit.

According to a still further aspect of the disclosure, a method is provided for disassembling a fuel injector. The method comprises: connecting a fuel injector to a socket; pushing a first handle to lock the fuel injector on the socket; and pulling down a second handle to engage a removal unit to the fuel injector to remove a cone nut. The removal unit may be automatically powered when the first handle is pushed and the second handle is pulled down.

The method may further comprise: pushing up the second handle to remove a circlip and a ferrule ring from the fuel injector; pushing down the second handle after the circlip and the ferrule ring are removed; and/or actuating a screwdriver to unscrew a screw from the fuel injector.

Additional features, advantages, and embodiments of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION OF THE DISCLOSURE

Figure 1:
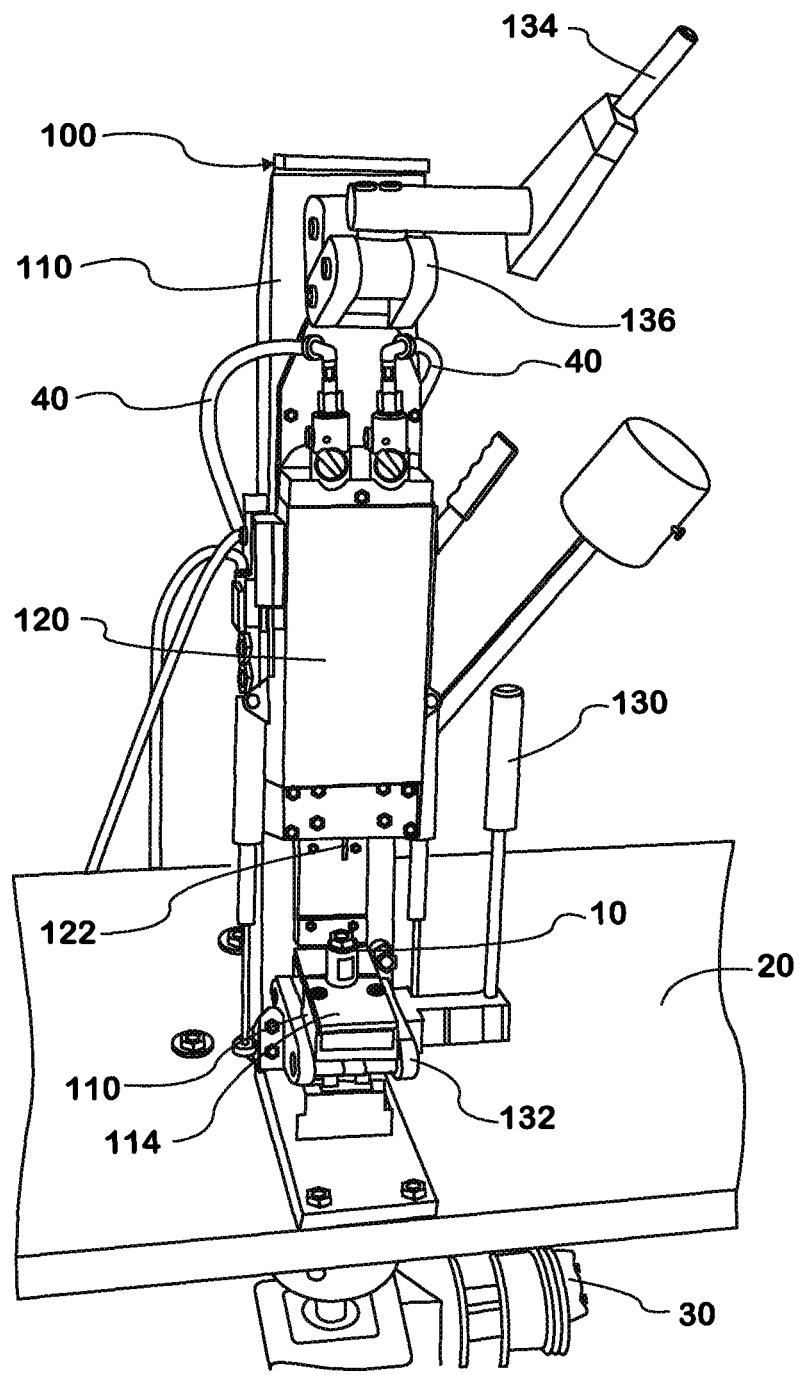
FIG. 1 shows an example of a disassembly station constructed according to the principles of the disclosure.

The embodiments of the disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as not to unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure, which is defined solely by the appended claims and applicable law. Moreover, it is noted that like reference numerals represent similar parts throughout the several views of the drawings.

A "computer", as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, or the like, or an array of processors, microprocessors, central processing units, general purpose computers, super computers, personal computers, laptop computers, palmtop computers, notebook computers, desktop computers, workstation computers, servers, or the like. Further, the computer may include an electronic device configured to communicate over a communication link. The electronic device may include, for example, but is not limited to, a mobile telephone, a personal data assistant (PDA), a mobile computer, a stationary computer, a smart phone, mobile station, user equipment, or the like.

The terms "including", "comprising" and variations thereof, as used in this disclosure, mean "including, but not limited to", unless expressly specified otherwise.

The terms "a", "an", and "the", as used in this disclosure, means "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

A "computer-readable medium", as used in this disclosure, means any medium that participates in providing data (for example, instructions) which may be read by a computer. Such a medium may take many forms, including non-volatile media, volatile media, and transmission media. Non-volatile media may include, for example, optical or magnetic disks and other persistent memory. Volatile media may include dynamic random access memory (DRAM). Transmission media may include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a computer. For example, sequences of instruction (i) may be delivered from a RAM to a processor, (ii) may be carried over a wireless transmission medium, and/or (iii) may be formatted according to numerous formats, standards or protocols, including, for example, WiFi, WiMAX, IEEE 802.11, DECT, 0G, 1G, 2G, 3G or 4G cellular standards, Bluetooth, or the like.

Figure 2:
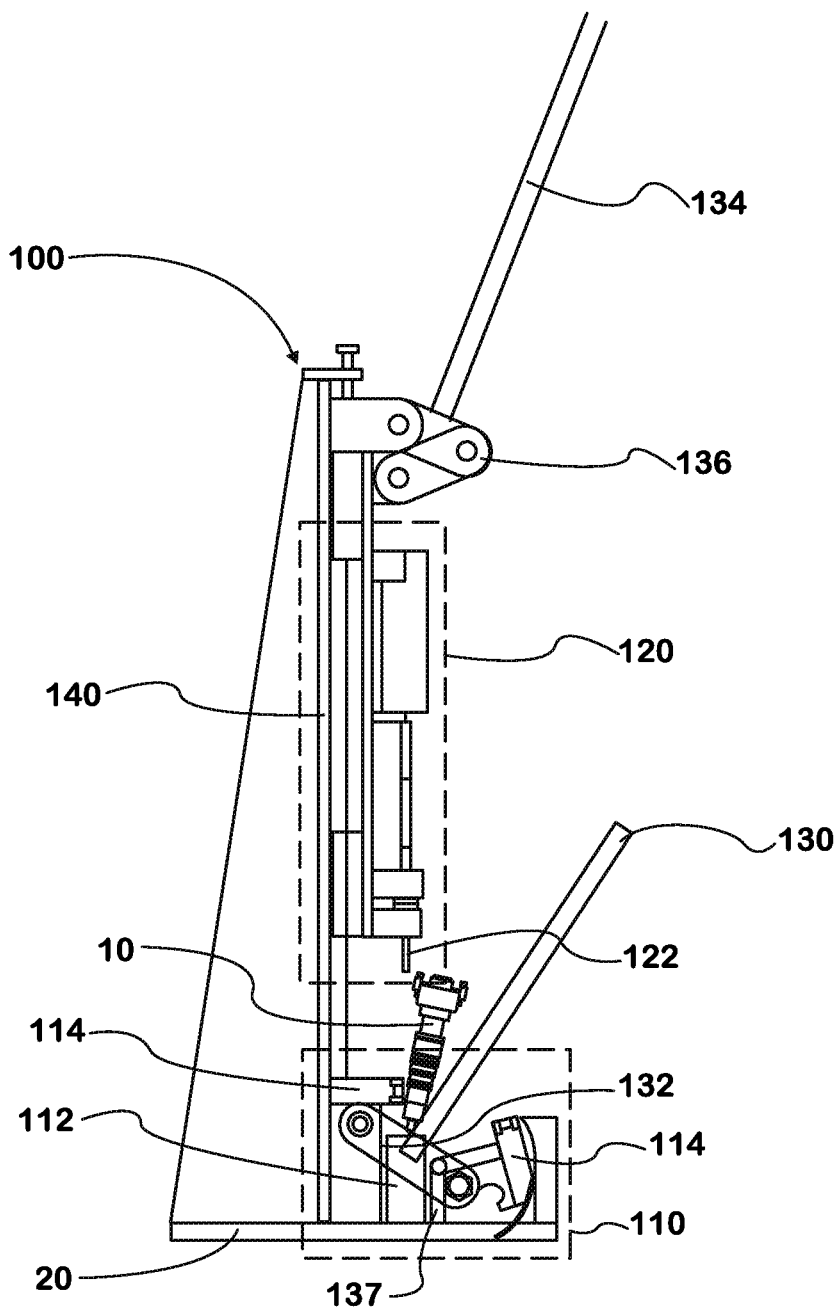
FIG. 2 shows a side view of the disassembly station of FIG. 1.
Figures 3A, 3B:
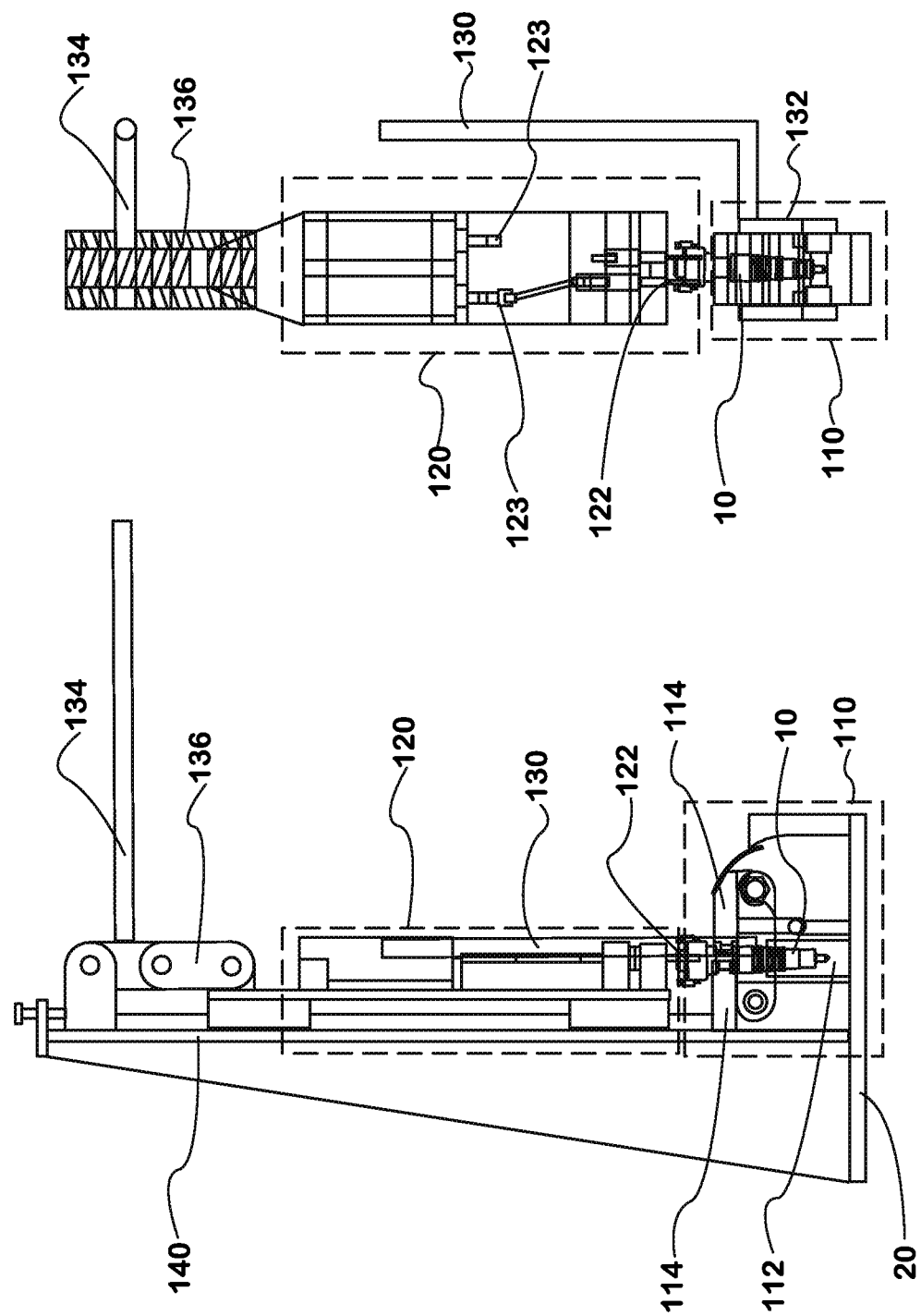
FIG. 3A shows another side view of the disassembly station of FIG. 1.
FIG. 3B shows a front view of the disassembly station of FIG. 1.

FIG. 1 shows an example of a disassembly station 100 constructed according to the principles of the disclosure. FIG. 2 shows a side view of the disassembly station 100 shown in FIG. 1. FIG. 3A shows another side of the disassembly station 100; and FIG. 3B shows a front view of the disassembly station 100. The disassembly station 100 may be used to disassemble and/or remove various components from a fuel injector, including, for example, a circlip, a ferrule ring, a nut, a screw, or the like, from a fuel injector. The fuel injector may include, for example, a diesel engine fuel injector, or the like.

Referring to FIGS. 1, 2, 3A and 3B concurrently, the disassembly station 100 may include a holding unit 110, a removal unit 120, a controller (not shown), and a plurality of actuating units. The plurality of actuating units may include, for example, a lower handle 130, an upper handle 134, a lower handle pivot connection 132, and an upper handle pivot connection 136. The holding unit 110 and the removal unit 120 may be coupled to and supported by a support body 140. The support body 140 may include, for example, an elongated vertical member, such as, for example, a rail, a track, or the like. The support body 140 may be affixed to a surface 20 (such as, for example, a table, a counter, a workbench, a floor, a wall, a machine, or the like) to provide an optimal height for operating the disassembly station 100. The holding unit 110 may be affixed to a lower portion of the support body 140 and the surface 20. The holding unit 110 may be configured to receive and hold a fuel injector 10 during disassembly.

The holding unit 110 may include a socket 112 (shown in FIG. 2) and a dock 114. The dock 114 may be configured to engage and lock the fuel injector 10 in the holding unit 110 on the socket 12 during disassembly. For example, the dock 114 may be configured to open to expose the socket 112 as seen in FIG. 2. After the fuel injector 10 is mounted on the socket 112, the dock 114 may be closed, as seen in FIGS. 3A and 3B, and the dock 114 may engage and lock the fuel injector 10 in the holding unit 110 on the socket 112. The controller may include a computer (not shown) that is configured to control the various processes (for example, processes 300, 400) carried out by the disassembly station 100, as described below.

The removal unit 120 may be configured to disassemble and/or remove various components, such as, for example, a circlip, a ferrule ring, a nut (e.g., a cone nut), a screw (e.g., an M4 screw), and the like, from the fuel injector 10. The removal unit 120 may be movably connected to the body 140 above the dock 114. The removal unit 120 may be configured to move vertically along, for example, a linear rail or track that may be included in the support body 140. The removal unit 120 may be further configured to engage the fuel injector 10 when it is locked in the holding unit 110 on a downward motion and disengage the fuel injector 10 on an upward motion. The removal unit 120 may include various removal tools, such as, for example, a stake/spring fork unit (not shown), a screwdriver 123 (shown in FIG. 3B), a cone nut remover 122, and the like.

The screwdriver 123 may be configured to engage a screw (e.g., an M4 screw) on the fuel injector on the downward motion of the removal unit 120. Once the screwdriver 123 has substantially fully engaged the screw, the screwdriver 123 may be actuated to turn the screw to release the screw from the fuel injector 10. The screwdriver 123 may be actuated based on, for example, a position of the removal unit 120 with respect to the dock 114, the type of fuel injector being disassembled, and the like. The screwdriver 123 may include a fastener such as, for example, a magnetized tip, a magnet, a clip, or the like, which is configured to hold and retract the screw from the fuel injector 10. The screwdriver 123 may be configured to retract the screw concurrently with, or at a different time as the removal unit 120 moves upward. As seen in FIG. 3B, the removal unit 120 may include a pair of screwdrivers 123 that are configured to substantially simultaneously (or at different times) engage and remove respective ones of a pair of screws on the fuel injector 10. The removal unit 120 may also include the cone nut remover 122, which may be configured to engage and remove a nut from the fuel injector 10 when the removal unit 120 engages the fuel injector 10.

The removal unit 120 may be operated by, for example, pneumatic power, hydraulic power, electrical power, manual power, or the like. In the case that the removal unit is powered by pneumatic power, the disassembly station 100 may include a pneumatic circuit (not shown). The pneumatic circuit may include the controller, a motor 30, a compressor (not shown) or pump (not shown), one or more tubes 40, a gearbox (not shown), a universal joint drive mechanism (not shown), one or more valves (not shown), one or more relays or switches (not shown), and the like. The pneumatic circuit may be configured to supply pressurized gas (e.g., air) to the removal unit 120 under the control of the controller. To allow a user to control the pneumatic circuit, the station 10 may include an actuator (not shown), such as, for example, a handle, a pedal, a switch, a button, or the like, that may be coupled to the controller. The motor 30, compressor (or pump), universal joint drive mechanism, valves, relays, and the like, may be placed proximate to the removal unit 120, such as, for example, below the surface 20, as seen in FIG. 1.

The lower handle 130 may be configured to operate the holding unit 110. For example, the user may pull or push the lower handle 130 to open or close the dock 114 and unlock or lock the fuel injector 10. The pivot connector 132 may be coupled to the lower handle 130, the holding unit 110, and the dock 114. The pivot connector 132 may be configured to convey a force applied by the user to the lower handle 130 and transfer the force to the holding unit 130 and the dock 114 to open (or close) the dock 114.

For example, as seen in FIG. 2, when the user pulls the lower handle 130 (e.g., away from the disassembly station 100), the pivot connector 132 pivots in a first direction with respect to the longitudinal axis of the support body 140, causing the dock 114 to pivot on a support 137 and retract away from support body 140, providing unobstructed access to the socket 112 and enabling mounting of a fuel injector on the socket 112. When the user pushes the lower handle 130 (e.g., toward the disassembly station 100), the pivot connector 132 pivots in a second direction (e.g., opposite to the first direction) with regard to the longitudinal axis of the support body 140, causing the dock 114 to pivot toward the support body 140 and engage and lock a fuel injector 10 that may have been mounted to the socket 112 in the holding unit 110.

The upper handle 134 may be configured to operate the removal unit 120. For example, the user may pull down or push up the upper handle 134 to move the removal unit 120 downwardly or upwardly along the longitudinal axis of the support body 140. The pivot connector 136 may be coupled between a portion of the upper handle 134 and a portion of the removal unit 120. Another portion of the upper handle 134 may be coupled to a portion of the holding unit 110. The pivot connector 136 may be configured to convey a force applied by the user to the upper handle 134 and transfer the force to the removal unit 120 to move the removal unit downwardly or upwardly with respect to, for example, the surface 20.

For example, when the user pulls down (or lowers) the upper handle 134, the applied force is transferred by the pivot connector 136 to the removal unit 120, causing the removal unit 120 to move downwardly and engage the fuel injector 10, if present in the holding unit 110. When the upper handle 134 is pushed up (or raised), the pivot connector 136 transfers the applied force to the removal unit 120, causing the removal unit 120 to move upwardly and disengage from the fuel injector 10.

Figure 4:
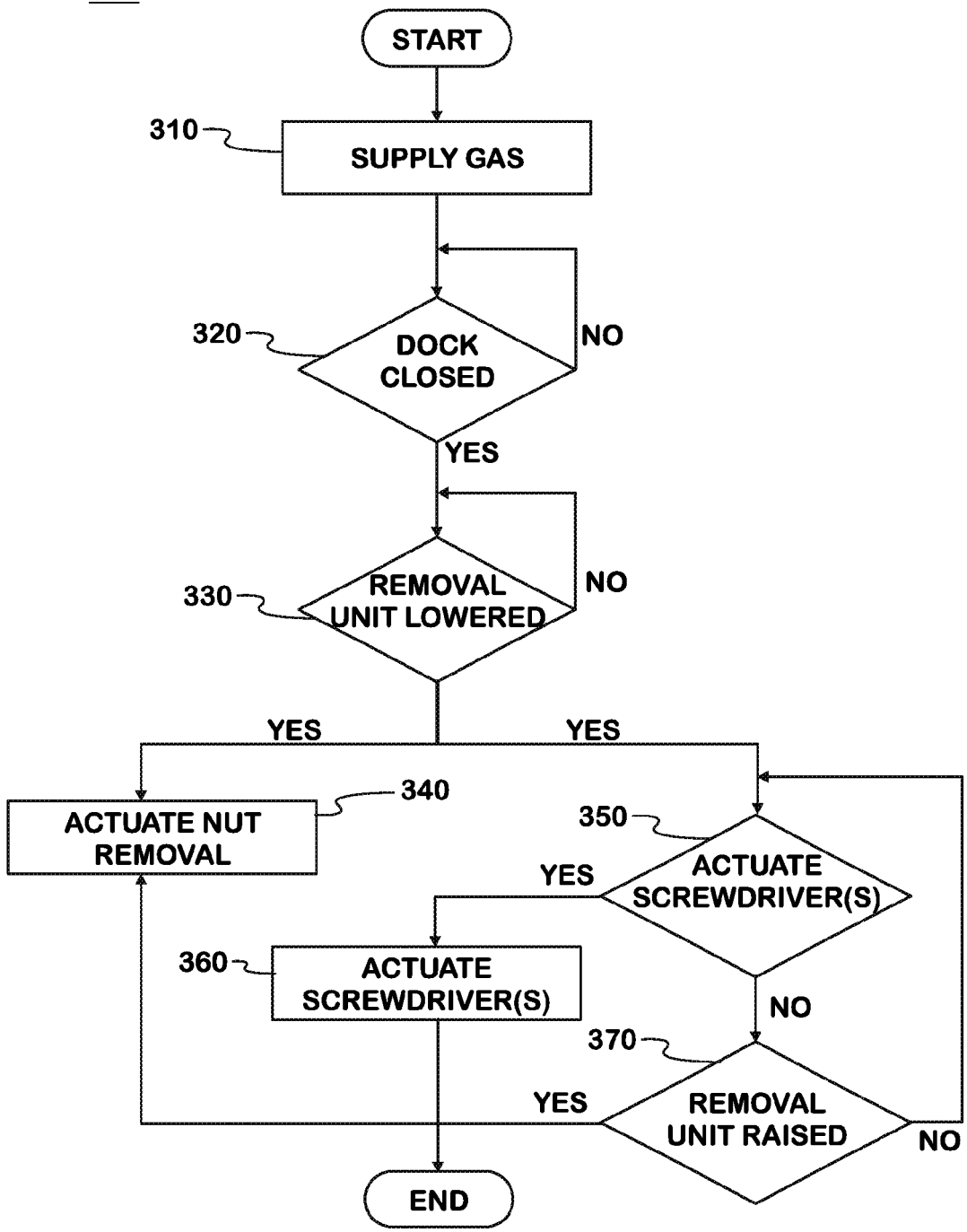
FIG. 4 is a flow chart of a process for controlling a pneumatic circuit, which may be used in the disassembly station of FIG. 1.

FIG. 4 is a flow chart of a process 300 for controlling the pneumatic circuit, according to the principles of the disclosure.

Referring to FIGS. 1 and 4, initially, a compressor or pump (not shown) may be turned ON to supply pressurized gas (e.g., air) to the supply tubes 40 of the disassembly station 100 (Step 310). A determination may be made whether the dock 114 is closed (Step 320). If a determination is made that the dock 114 is closed (YES at Step 320), then a determination may be made whether the removal unit 120 has been moved downwardly by a predetermined distance (Step 330), otherwise the process 300 waits until the dock 114 is closed (NO at Step 320). The predetermined distance may include a distance where the removal unit 120 is close to engaging the fuel injector 10.

If a determination is made that the removal unit 120 has moved downwardly by the predetermined distance (YES at Step 330), then a valve (not shown) may be opened to allow the pressurized gas to drive the nut remover 122 to engage and remove a cone nut from the fuel injector 10 (Step 340), otherwise the process 300 waits for the removal unit 120 to be downward by the predetermined distance (NO at Step 330). Further, a determination may be made whether to actuate one or more screwdrivers 123 in the removal unit 120 (Step 350). The determination may be made by the controller in response to a control signal received from the user via, for example, a switch, or the like.

If a determination is made to actuate one or more of the screwdrivers 123 (YES at Step 350), then one or more valves (not shown) may be opened to allow the pressurized gas to drive the screwdrivers 123 to engage and unscrew the screws on the fuel injector 10 (Step 360), otherwise the process 300 proceeds to determine whether the removal unit 120 has begun to move upward (NO at Step 360, then Step 370).

If a determination is made that the removal unit 120 has not moved upward (NO at Step 370), then the process 300 may return to determine whether the screwdrivers 123 are to be actuated (Step 350).

A computer readable medium may provided that includes a computer program tangibly embodied therein, which, when executed on the computer, may cause each of the Steps 310 to 370 to be carried out. The computer readable medium may include a segment or section of code for each of the Steps 310 to 370.

Figure 5:
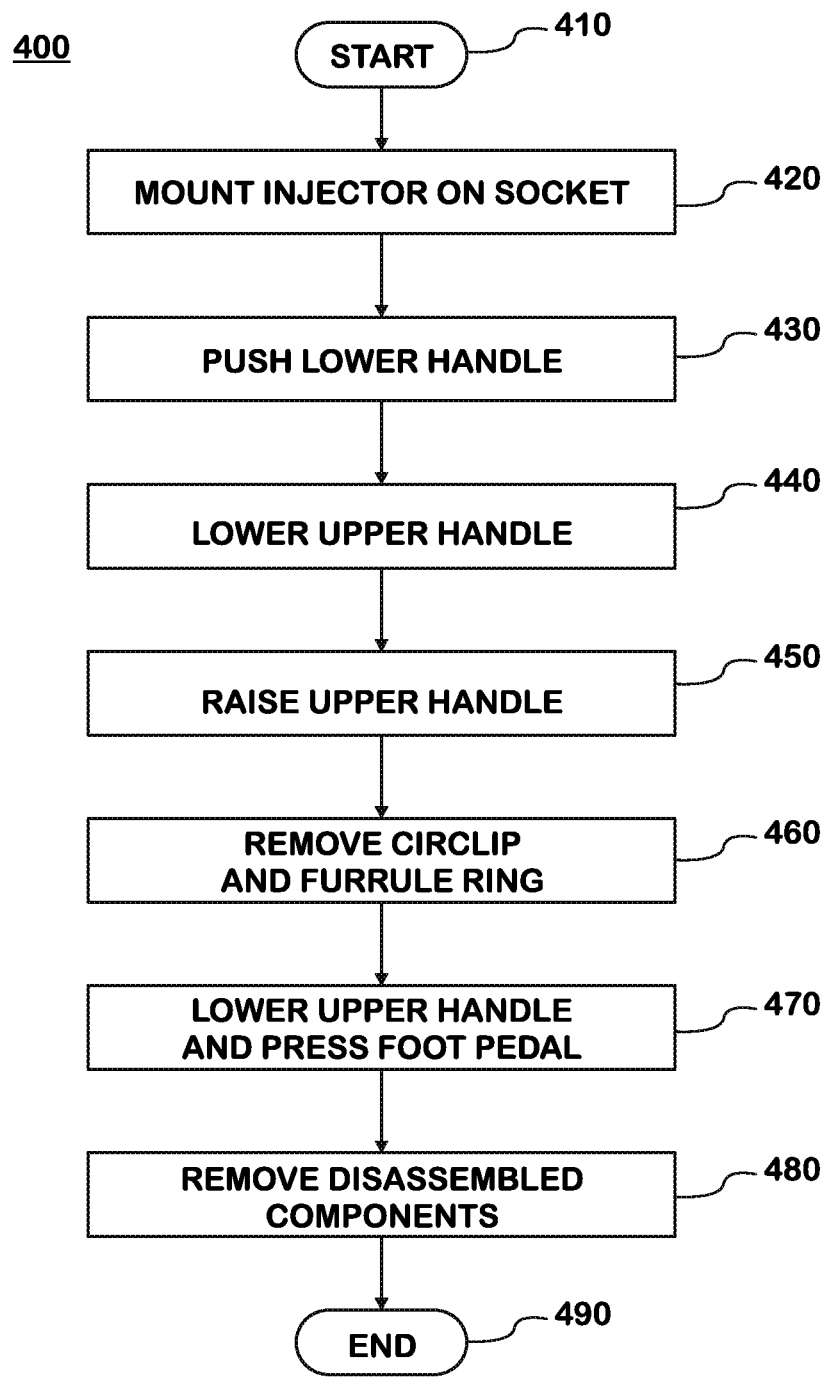
FIG. 5 is a flow chart of a process for disassembling a fuel injector using the fuel injector disassembly station shown in FIG. 1.

FIG. 5 shows a flow chart of a process 400 for disassembling the fuel injector 10 using the disassembly station 100 shown in FIG. 1. Upon starting the process 400 (Step 410), the user may mount the fuel injector 10 on the socket 112 of the holding unit 110 (Step 420). If the dock 114 is in the closed position (shown in FIGS. 1 and 3A), the user may need to first pull on the lower handle 130 to retract the dock 114 and render the socket 112 accessible. Then, the user may push the lower handle 130 (Step 430) to close the dock 114 and lock the fuel injector 10 in the holding unit 110 for disassembly. Once the fuel injector 10 is locked to the holding unit 110, the user may lower or pull down the upper handle 134 (Step 440) to drive the removal unit 120 downwardly to engage the fuel injector 10 and unscrew the cone nut from the fuel injector 10. When the removal unit 120 is pushed downwardly (Step 440), the stake/spring fork unit (not shown) may be inserted into a bore (not shown) of the fuel injector 10 to dislodge (or dislocate) the circlip (not shown) and the ferrule ring (not shown) for removal. Further, with the downward movement of the removal unit 120, one or more of the screwdrivers 123 of the removal unit 120 may engage a respective screw (e.g., an M4 screw) on the fuel injector 10 and, when substantially fully engaged to the respective screw, the one or more screwdrivers may be actuated to turn and loosen the respective screws (Step 440).

When the user pushes up or raise the upper handle 134 (Step 450), the stake/spring fork unit may remove the circlip and ferrule ring from the fuel injector 10 (Step 460). The user may remove the circlip, ferrule ring, and cone nut from the disassembly station 100. Subsequently, the user may pull down or lower the upper handle 134 and depress a foot pedal (not shown) to connect the pneumatic circuit to the screwdrivers 123 (Step 470), and the pair of screwdrivers 123 may unscrew a pair of screws (not shown) from the fuel injector 10. The user may remove the disassembled components (e.g., the circlip, ferrule ring, cone nut and M4 screws) from the station 100 (Step 480) and the process 400 may terminate (Step 490).

Accordingly, the disassembly station 10 may quickly remove components, such as, e.g., the circlip, the ferrule ring, the cone nut and the screws, or the like, from the fuel injector 10 with minimal effort. Thus, the process for removing various components for remanufacturing/recycling may be simplified and shortened using a single station.

It is noted that the process 400 may be automated. In this regard, a computer readable medium may provided that includes a computer program tangibly embodied therein, which, when executed on the computer, may cause each of the Steps 410 to 490 to be carried out. The computer readable medium may include a segment or section of code for each of the Steps 410 to 490.

While the disclosure has been described in terms of exemplary embodiments, those skilled in the art will recognize that the disclosure can be practiced with modifications in the spirit and scope of the appended claims. These examples given above are merely illustrative and are not meant to be an exhaustive list of all possible designs, embodiments, applications or modifications of the disclosure.

What is claimed is:

1. An apparatus for disassembling a fuel injector, comprising:
   a holding unit configured to hold the fuel injector for disassembly;
   a removal unit comprising:
      a first removal tool configured to remove a circlip and ferrule ring from the fuel injector;
      a second removal tool configured to remove a cone nut from the fuel injector; and
      a third removal tool configured to remove a screw from the fuel injector; and an actuating unit comprising:
      a first actuator configured to operate the holding unit;
      a second actuator configured to move the removal unit; and
      a third actuator configured to operate the third removal tool.

2. The apparatus of claim 1, wherein the holding unit comprises:
   a socket that receives the fuel injector; and
   a dock connected to the first actuator and configured to lock the fuel injector on the socket.

3. The apparatus of claim 2, wherein the first actuator comprises:
   a first handle; and
   a first pivot connector coupled between the first handle and the dock and configured to transfer an applied force from the first handle to the dock.

4. The apparatus of claim 3, wherein the dock is configured to open and expose the socket when the first handle is pulled, and further configured to close and lock the fuel injector on the socket when the first handle is pushed.

5. The apparatus of claim 3, wherein the second actuator comprises:
   a second handle; and
   a second pivot connector coupled between the second handle and the removal unit,
   wherein the second pivot connector is configured to transfer an applied force from the second handle to the removal unit.

6. The apparatus of claim 5, wherein the removal unit is configured to engage the fuel injector for disassembly when the second handle is pulled down, and further configured to disengage from the fuel injector when the second handle is pushed up.

7. The apparatus of claim 6, wherein the first removal tool is configured to dislodge the circlip and the ferrule ring when the removal unit is pushed down, and further configured to remove the circlip and the ferrule ring from the fuel injector when the removal unit is pulled up.

8. The apparatus of claim 6, further comprising a pneumatic circuit configured to power the second removal tool and the third removal tool.

9. The apparatus of claim 8, wherein the second removal tool comprises a first screwdriver.

10. The apparatus of claim 9, wherein the first screwdriver is powered by the pneumatic circuit when the first handle is pushed and the second handle is pulled down.

11. The apparatus of claim 9, wherein the third removal tool comprises a second screwdriver.

12. The apparatus of claim 11, wherein the second screwdriver is powered by the pneumatic circuit when the third actuator is activated by a user.

13. The apparatus of claim 12, wherein the third actuator comprises a pedal connected to the pneumatic circuit.

14. The apparatus of claim 13, wherein the screw comprises an M4 screw.

15. The apparatus of claim 14, wherein the fuel injector comprises two M4 screws and the third removal tool comprises two second screwdrivers for unscrewing the two M4 screws.

16. An apparatus for disassembling a fuel injector, comprising:
  a holding unit configured to hold a fuel injector for disassembly;
  a removal unit comprising a nut remover and a screwdriver; and
  an actuating unit comprising
    a first actuator configured to operate the holding unit,
    a second actuator configured to move the removal unit, and
    a third actuator configured to operate the removal unit.

* * * * *